United States Patent [19]

Isono et al.

[11] Patent Number: 5,892,918
[45] Date of Patent: Apr. 6, 1999

[54] BLOCK TRANSFER METHOD FOR USE WITH PARALLEL COMPUTER SYSTEM

[75] Inventors: Soichi Isono; Yuzuru Maya, both of Sagamihara; Akira Ohtsuji, Yokohama, all of Japan

[73] Assignee: Hitachi, Ltd., Tokyo, Japan

[21] Appl. No.: 815,089

[22] Filed: Mar. 11, 1997

[30]     Foreign Application Priority Data

Mar. 11, 1996 [JP] Japan .................................... 8-082057

[51] Int. Cl.⁶ ............................ G06F 13/14; G06F 13/38
[52] U.S. Cl. .............................. 395/200.57; 395/200.58; 395/200.72; 711/133
[58] Field of Search ......................... 395/200.33, 200.57, 395/825, 307, 855, 200.03, 800.23, 200.59, 800.04, 200.72, 182.03, 309, 207; 711/133, 145, 144, 146, 149; 370/346, 349; 455/89

[56]                  References Cited

U.S. PATENT DOCUMENTS

| 4,675,840 | 6/1987 | Raymond et al. | 704/200 |
| 5,388,266 | 2/1995 | Frey et al. | 364/DIG. 1 |
| 5,570,367 | 10/1996 | Ayanoglu et al. | 455/89 |
| 5,740,465 | 4/1998 | Matsunami et al. | 595/825 |

FOREIGN PATENT DOCUMENTS

| 0563623A2 | 3/1993 | European Pat. Off. . |
| 6-4490 | 1/1994 | Japan . |
| 6-83781 | 3/1994 | Japan . |

*Primary Examiner*—Daniel H. Pan
*Attorney, Agent, or Firm*—Antonelli, Terry, Stout & Kraus, LLP

[57]                    ABSTRACT

A parallel computer system and a block transfer method and computer program for use with the parallel computer system which includes at least one processing unit divided into a plurality of logical processing units and a connecting device which exchanges commands and acknowledgements with the processing unit. The connecting device edits into a single command or acknowledgement individual commands or acknowledgements to be sent to the logical processing units and sends the single command or acknowledgement to the processing unit. The single command or acknowledgement includes a header, a command or acknowledgement code, logical processing unit numbers and pieces of command or acknowledge information corresponding to the logical processing units. The processing unit divides the single command or acknowledge into the individual commands or acknowledgements for the logical processing units and notifies the latter of these commands or acknowledgements. The invention operates in a similar manner when sending commands or acknowledgements from the logical processing units to the connecting device.

36 Claims, 12 Drawing Sheets

FIG. 6

| LOGICAL PROCESSING UNIT NO. | MUTUAL INVALIDATION COMMAND | LIST NOTIFICATION COMMAND |
|---|---|---|
| LOGICAL PROCESSING UNIT (10) | ○ | ○ |
| LOGICAL PROCESSING UNIT (11) | ○ | ○ |
| LOGICAL PROCESSING UNIT (12) | ○ | ○ |

(20-10, 20-11, 20-12)

BLOCK TRANSFER METHOD FOR USE WITH PARALLEL COMPUTER SYSTEM

BACKGROUND OF THE INVENTION

The present invention relates to a parallel computer system and a method and computer program for use in the parallel computer system which includes one processing unit divisible into a plurality of logical processing units and a connecting device shared by these logical processing units. More particularly, the present invention relates to a parallel computer system and a block transfer method and computer program for use with the parallel computer system, whereby a plurality of commands or acknowledgements to be sent from a connecting device to logical processing units included in the parallel computer system and vice versa are edited into a single command or a single acknowledgement to be transferred therebetween.

In a typical parallel computer system described illustratively in Japanese Patent Laid-Open No. Hei 6-4490, "Data Processing System," (corresponding to European Patent application No. EP0563623A2) a plurality of processing units (called the "central processing complex" in the cited reference) are connected to a connecting device via dedicated a channel (called the "IS channel" in the cited reference). Data shared between the processing units are retained in a memory arrangement called a cache or list structure inside the connecting device, whereby the processing units are operated in parallel.

When one of the processing units updates the cache in the connecting device, the connecting device transmits a mutual invalidation command to the processing unit in question. When a processing unit updates the list in the connecting device so that a transition takes place from blank to filled state or vice versa in the list, the connecting device transmits a list notification command to the processing unit in question.

There is a specific case in which, as depicted in FIG. 26 of Japanese Patent Laid-Open No. Hei 6-83781, "Method for Managing Data Objects Used by a Local Processing Complex to Retain Shared Data Status Information," (corresponding to U.S. Pat. No. 5,388,266) the processing unit is divided into a plurality of logical processing units (called "images" in the cited reference) connected by a connecting device. In that case, the connecting device transmits a mutual invalidation (XI) command to each of the local processing units as needed.

In the parallel computer system in which the processing unit is divided into a plurality of logical processing units connected by the connecting unit, the connecting unit transmits commands or acknowledgements to these logical processing units and vice versa. In such transmitting operations, all commands or acknowledgements pass through the same channel. One disadvantage of this setup is that the channel is so often occupied by the transmitted commands or acknowledgements that other processing may be adversely affected thereby.

SUMMARY OF THE INVENTION

It is therefore an object of the present invention to provide a parallel computer system and a block transfer method and computer program for use with the parallel computer system, wherein a channel is prevented from being monopolized by a connecting device transmitting commands or acknowledgements to a plurality of logical processing units.

It is another object of the present invention to provide a parallel computer system and a block transfer method and computer program for use with the parallel computer system, wherein a channel is prevented from being monopolized conversely by a plurality of logical processing units sending commands or acknowledgements to the connecting unit.

In carrying out the invention and according to a first aspect thereof, there is provided a parallel computer system and a block transfer method and computer program for use with the parallel computer system. The parallel computer system includes at least one processing unit divisible into a plurality of logical processing units, and a connecting device shared by and connected to the plurality of logical processing units. The logical processing units and the connecting device exchange therebetween either commands representing processing requests or acknowledgements representing results of command processing. The block transfer method and computer program comprises the step of and the parallel computer system performs the operation of causing the connecting device to edit either a plurality of pieces of command information or a plurality of acknowledgements, destined from the connecting device for each of the plurality of logical processing units, into either a single command or a single acknowledgement to be transmitted to the processing unit.

In a first preferred structure according to the present invention, the connecting device includes a main processor for processing commands from the plurality of logical processing units and for generating commands destined for the plurality of logical processing units, and an input/output processor for receiving either commands or acknowledgements from the processing unit and for transmitting either commands or acknowledgements to the processing unit. The block transfer method and computer program comprises the step of and the parallel computer system performs the operation of causing the input/output processor of the connecting device to edit into either a single command or a single acknowledgement, either a plurality of pieces of command information generated by the main processor of the connecting device regarding each of the plurality of logical processing units, or a plurality of acknowledgements provided by the main processor performing command processing with respect to each of the plurality of logical processing units, either the single command or the single acknowledgement being transmitted to the processing unit.

In a second preferred structure according to the invention, the processing unit includes a main processor for processing commands from the connecting device and for generating commands destined for the connecting device, and an input/output processor for receiving either commands or acknowledgements from the connecting device and for transmitting either commands or acknowledgements to the connecting device. The block transfer method and computer program comprises the step of and the parallel computer system performs the operation of causing the input/output processor of the processing unit to receive either the single command or the single acknowledgement editing either a plurality of pieces of command information or a plurality of acknowledgements sent from the connecting device, and to divide either the command or the acknowledgement received by the input/output processor of the processing unit into either commands or acknowledgements destined for the plurality of logical processing units.

According to a second aspect of the present invention, there is provided a parallel computer system and a block transfer method and computer program for use with the parallel computer system. The parallel computer system includes at least one processing unit divisible into a plurality of logical processing units, and a connecting device shared by and connected to the plurality of logical processing units. The logical processing units and the connecting device exchange therebetween either commands representing processing requests or acknowledgements representing results of command processing. The block transfer method and computer program comprises the step of and the parallel computer system performs the operation of causing the processing unit to edit either a plurality of pieces of command information or a plurality of acknowledgments, destined from the plurality of logical processing units for the connecting device, into either a single command or a single acknowledgement to be transmitted to the connecting device.

In a third preferred structure according to the present invention, the processing unit includes a main processor for processing commands from the connecting device and for generating commands destined for the connecting device, and an input/output processor for receiving either commands or acknowledgements from the connecting device and for transmitting either commands or acknowledgements to the connecting device. The block transfer method and computer program comprises the step of and the parallel computer system performs the operation of causing the input/output processor of the processing unit to edit into either a single command or a single acknowledgement, either a plurality of pieces of command information destined for the connecting device and generated by the main processor of the processing unit with respect to each of the plurality of logical processing units, or a plurality of acknowledgements destined for the connecting device and provided by the main processor performing command processing with respect to each of the plurality of logical processing units, either the single command or the single acknowledgement being transmitted to the connecting device.

In a fourth preferred structure according to the present invention, the connecting device includes a main processor for processing commands from the plurality of logical processing units and for generating commands destined for the plurality of logical processing units, and an input/output processor for receiving either commands or acknowledgements from the processing unit and for transmitting either commands or acknowledgements to the processing unit. The block transfer method and computer program comprises the step of and the parallel computer system performs the operation of causing the input/output processor of the processing unit to receive either the single command or the single acknowledgement editing either a plurality of pieces of command information or a plurality of acknowledgements sent from the processing unit, and to divide either the command or the acknowledgement received by the input/output processor of the connecting device into either commands or acknowledgements destined for the plurality of logical processing units.

BRIEF DESCRIPTION OF THE DRAWINGS

The present invention will be more apparent from the following detailed description, when taken in conjunction with the accompanying drawings, in which:

FIG. 6 is a diagram of a logical processing unit table;

DETAILED DESCRIPTION OF THE PREFERRED EMBODIMENTS

Figure 1:
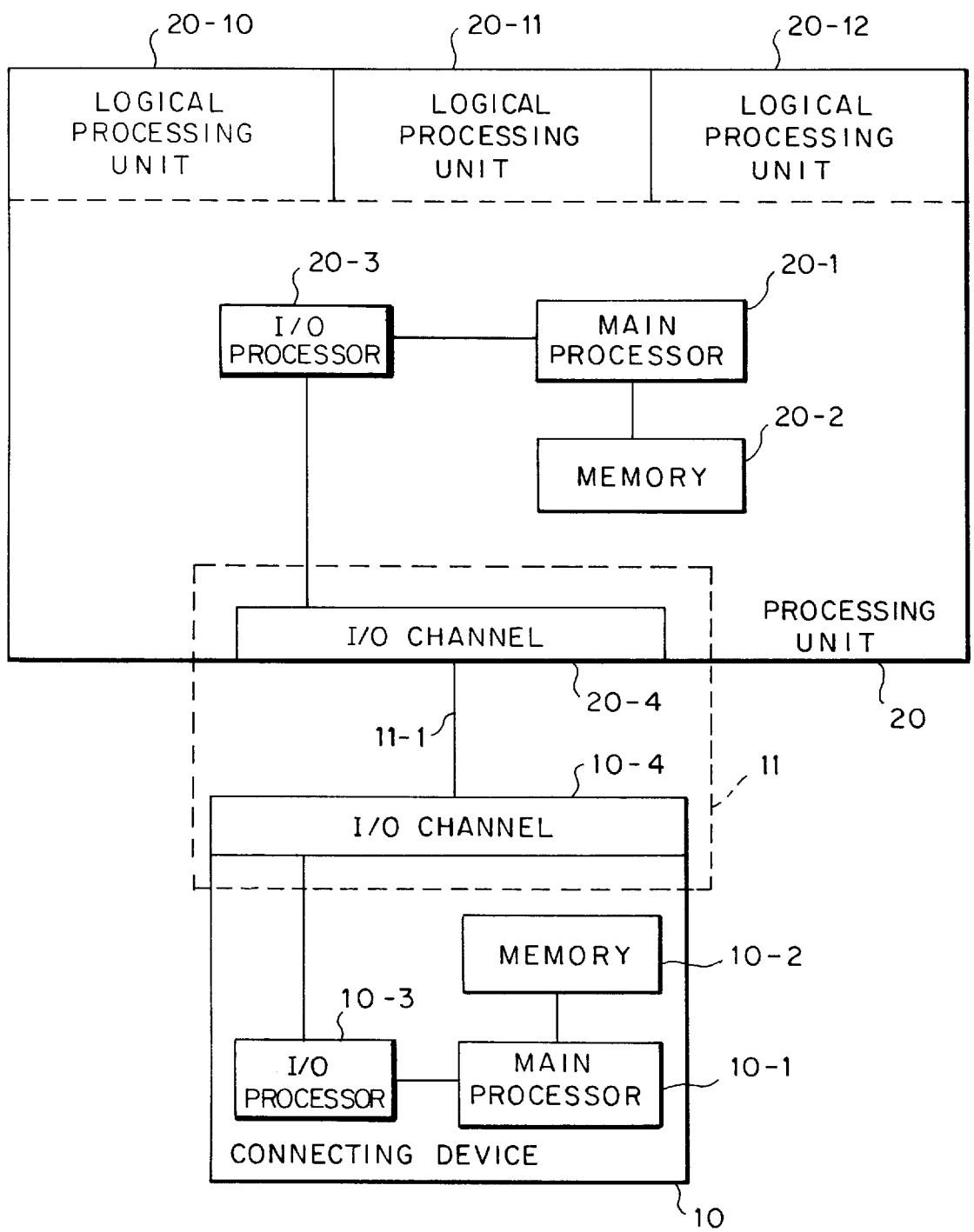
FIG. 1 is a block diagram of a parallel computer system to which the present invention is applied.

The preferred embodiments of the present invention will now be described with reference to the accompanying drawings. FIG. 1 is a block diagram of a parallel computer system to which the present invention is applied. As illustrated in FIG. 1, the parallel computer system comprises a connecting device 10 and a processing unit 20 connected by a channel device 11.

The connecting device 10 and the processing unit 20 are identical in hardware structure, and are each composed of a main processor 10-1, 20-1, a memory 10-2, 20-2, an input/output processor 10-3, 20-3 and an input/output channel 10-4, 20-4. The two I/O channels 10-4, 20-4 and a channel cable 11-1 constitute the channel device 11. The processing unit 20 is logically divided into three logical processing units 20-10 to 20-12. The logical processing units 20-10 to 20-12 take turns using the main processor 20-1 at fixed time intervals, thereby performing a plurality of processes apparently in parallel.

Each of the logical processing units 20-10 to 20-12 and the connecting device 10 exchange commands, a processing request each, and acknowledgements, a result of command processing each, via the channel device 11.

Figure 2:
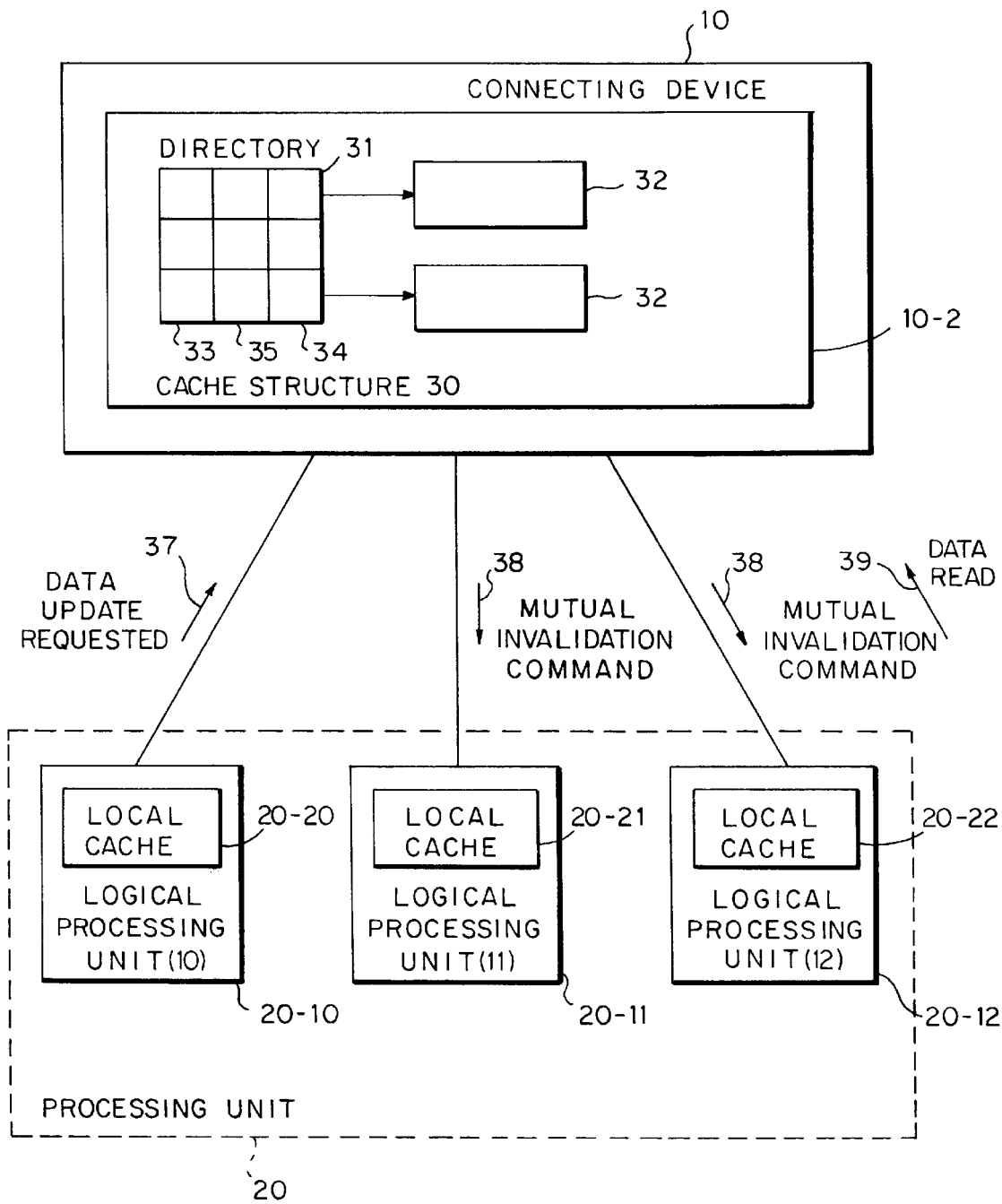
FIG. 2 is a schematic diagram of an example of a cache structure.
Figure 3:
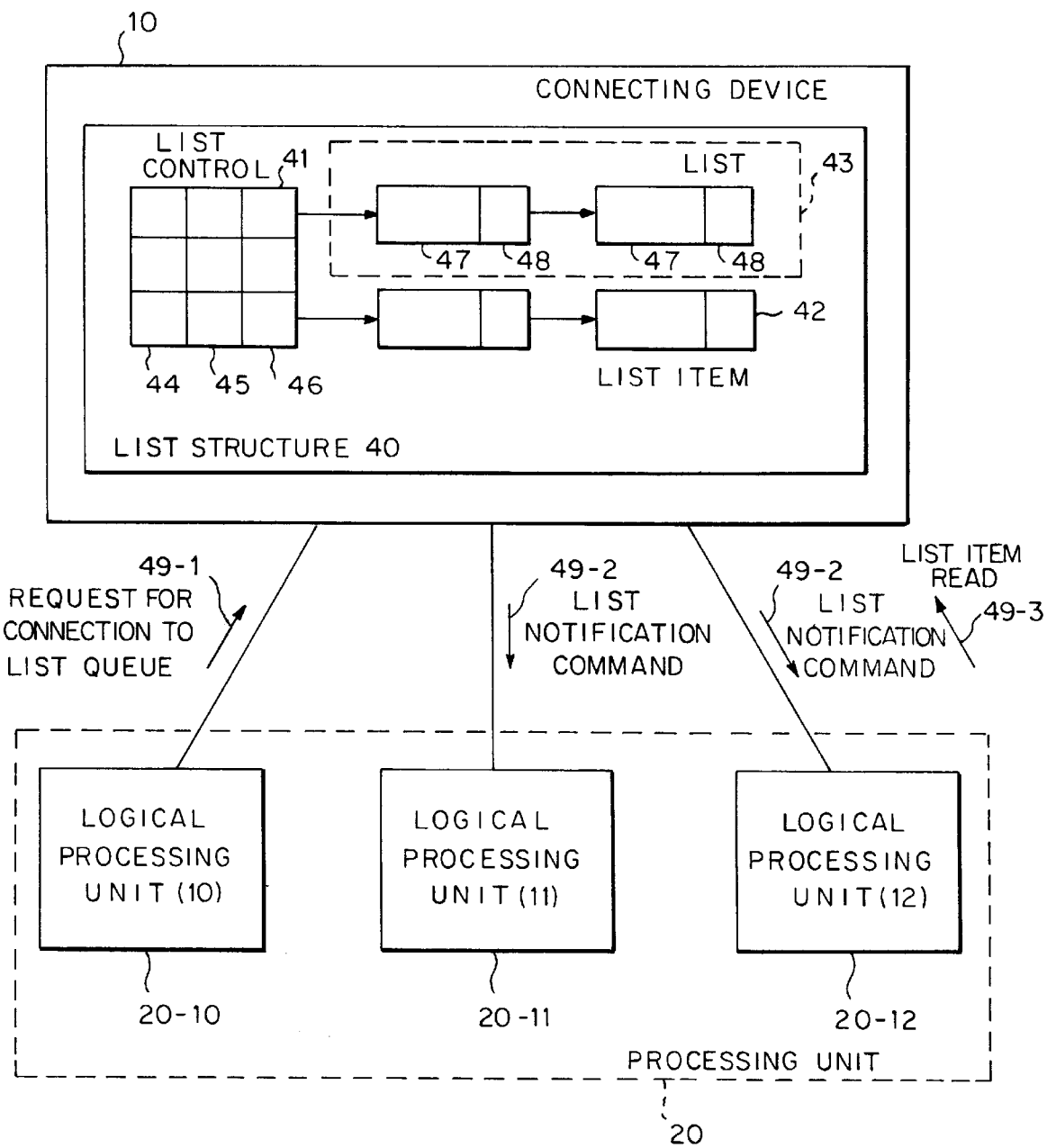
FIG. 3 is a schematic diagram of an example of list structure.

The connecting device 10 as illustrated in FIG. 2 comprises a cache structure 30 offering a data caching function to the logical processing units 20-10 to 20-12, and a list structure 40 as illustrated in FIG. 3 providing the function of message communication between the logical processing units 20-10 to 20-12. The two structures are located in the memory 10-2. Below is a description of first the cache structure 30, followed by the list structure 40.

FIG. 2 is a schematic diagram of the cache structure 30. The cache structure 30 comprises a directory 31 and cache data 32. The directory 31 contains names 33 corresponding to the cache data 32, pointers 34 pointing to the locations where the cache data 32 are retained, and user information 35 indicating which logical processing unit of the logical processing units 20-10 through 20-12 is currently using the cache data 32. The names 33 are used by the logical processing units 20-10 to 20-12 designating the cache data 32. Using the pointers 34, the connecting device 10 establishes one-to-one correspondence between the names 33 and the cache data 32.

The data caching function is a function that allows the logical processing units 20-10 to 20-12 to share data therebetween, as shown in FIG. 2. Each of the logical processing units 20-10 to 20-12 has a local cache 20-20 to 20-22 containing a copy of the cache data in the cache structure 30. When carrying out their internal processing, the logical processing units 20-10 to 20-12 utilize their copied cache data. If the local caches 20-20 to 20-22 have contents different from the original cache data, the system as a whole is incapable of carrying out its processing normally. To keep the cache data 32 in the cache structure 30 and their copies in the local caches 20-20 to 20-22 identical requires that the connecting device 10 and the logical processing units 20-10 to 20-12 operate as described below.

The initial assumption is that the user information 35 indicates that the cache structure 30 and the local caches 20-20 to 20-22 retain the same contents and that the logical processing units 20-10 to 20-12 are currently using the cache data 32. Suppose now that the logical processing unit 20-10 requests an update of the cache data 32 in the cache structure 30 (process 37). In that case, the update of the cache data 32 is carried out first, followed by that of the local cache 20-20.

Using mutual invalidation commands, the connecting device 10 notifies the other logical processing units 20-11, 20-12, which currently use the updated cache data 32 based on the user information 35, that a transition state has occurred in the cache structure and that the contents of the local caches 20-21, 20-22 are now invalid (process 38). Upon receipt of the mutual invalidation commands, the logical processing units 20-11, 20-12 read the updated cache data 32 from the connecting device 10 (process 39), and update the copies in their local caches 20-21, 20-22. The operations above keep the cache data 32 in the cache structure 30 identical to the copies in the local caches 20-20 to 20-22.

In the manner described, an update of data in the cache structure 30 prompts invalidation of the contents in the local cache 20-20 to 20-22 of the logical processing units. To notify the logical processing units of the update in the cache data, the connecting device 10 issues as many mutual invalidation commands as the number of logical processing units configured.

FIG. 3 is a schematic diagram of an example of a list structure. The list structure 40 comprises a plurality of list controls 41 and a plurality of list items 42 connected serially to each of the list controls 41. There may be some list controls 41 not connected to any list item 42. The series of list items 42 connected to one list control 41 is called a list 43. If no list item 42 is connected to a given list control 41, the list 43 is said to be blank.

The list controls 41 each include a list number 44 identifying the list in question, user information 45 indicating which logical processing unit of the logical processing units of 20-10 to 20-12 is currently using the list 43, and a pointer 46 pointing to the location where the first list item 42 of the connected series is stored. Each list item 42 comprises data 47 and a pointer 48 pointing to the location where the next list item 42 is held. When any one of the logical processing units 20-10 to 20-12 requests that a new list item 42 be connected, the connecting device 10 suffixes the new list to the end of the list 43 whose list number 44 is designated by the logical processing unit in question. A value "0" is loaded into the pointer 46 or 48 at the end in order to show that no further list item 42 exists.

The message communication function, as illustrated in FIG. 3, is a function that transfers data 47 between the logical processing units 20-10 to 20-12. This function is supported by the connecting device 10 with its ability to transmit list notification commands to the logical processing units identified by the user information 45. The list notification commands are transmitted when a transition takes place from blank to filled state or vice versa in any one list 43. To transfer the data 47, the connecting device 10 and logical processing units 20-10 to 20-12 perform the processes described below.

In advance, the logical processing units 20-10 to 20-12 specify in the user information 45 that a list 43-1 is to be used thereby. Suppose that the list 43-1 is initially blank. In that case, the logical processing unit 20-10 requests the connecting device 10 to add a list item 42 to the list process 49-1. In response, the connecting device 10 attaches a new list item to the list 43-1.

Now that the list 43-1 has transmitted from its blank state to a filled state, the connecting device 10 transmits list notification commands process 49-2. On receiving the list notification commands, the logical processing units 20-11, 20-12 read the list item 42 from the list 43-1 process 49-3. In this manner, the connecting device 10 must transmit list notification commands to all logical processing units 20-11, 20-12. It is notified to the logical processing unit 20-10 by the other list 43 that the logical processing units 20-11, 20-12 have read the applicable list item 42, and then the notified logical processing unit 20-10 vacates the list 43-1 for subsequent use.

One characteristic of this invention is that the connecting device 10 transmits commands or acknowledgements of these commands in block to the logical processing units 20-10 to 20-12. The processing unit 10 divides the received block of commands or acknowledgements into individual commands or acknowledgements that are processed individually. Likewise, the logical processing units 20-10 to 20-12 transmit their commands or acknowledgements in block to the connecting device 10. In turn, the connecting block 1 divides the received block of commands or acknowledgements into separate commands or acknowledgements to be processed subsequently. That is, a plurality of commands or acknowledgements are edited into a single command or acknowledgement for transmission, so that the occupancy level of the channel device is reduced.

Figure 4:
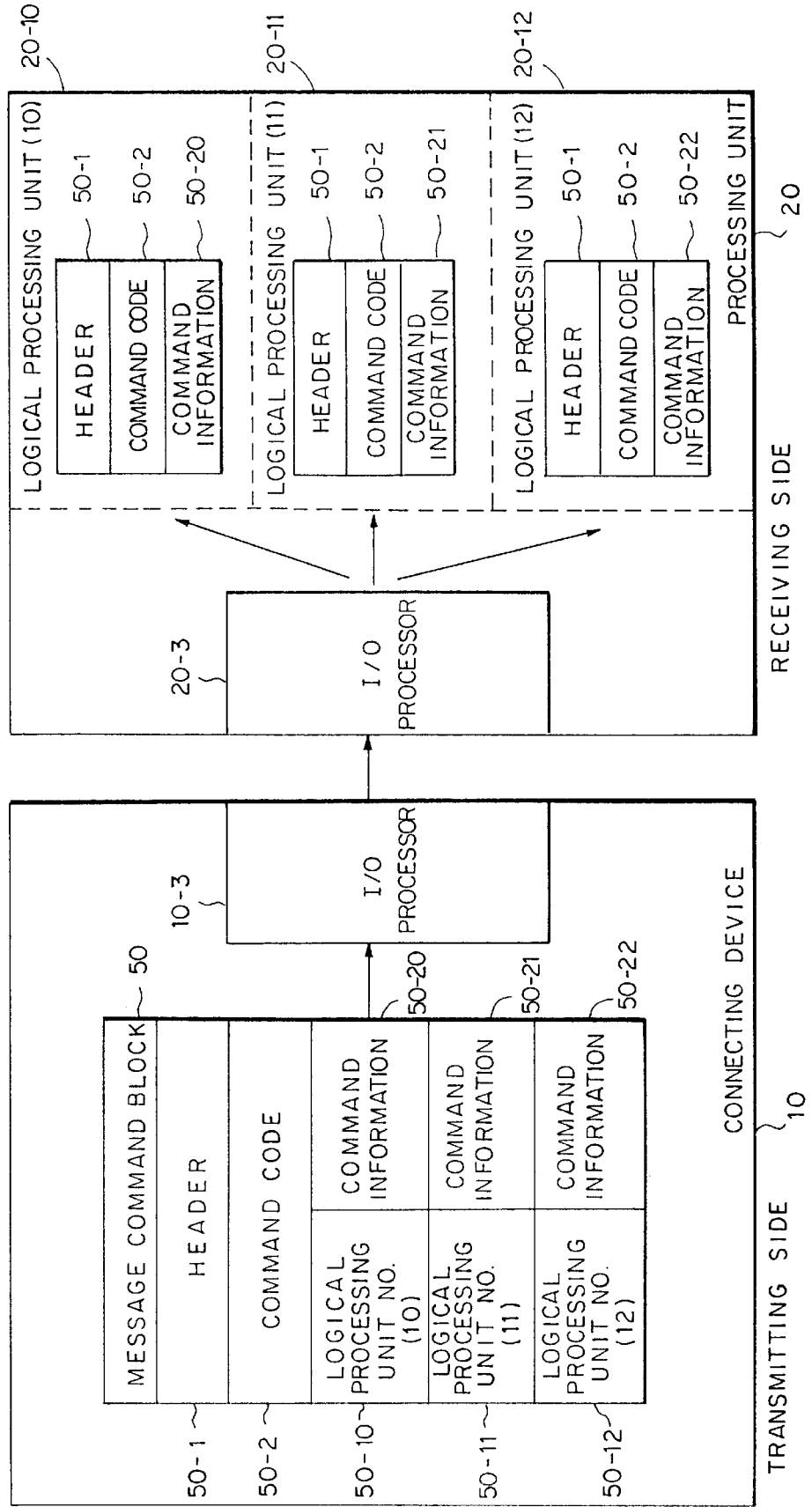
FIG. 4 is a schematic diagram outlining the processing effected by the present invention.

FIG. 4 is a schematic diagram outlining the processing effected by the present invention. When the cache structure 30 or list structure 40 develops a state transition, the connecting device 10 must notify the logical processing units 20-10 to 20-12 thereof. In carrying out the notification, the connecting device 10 edits into a single command those commands destined for the individual logical processing units 20-10 to 20-12, and sends the single command to the processing unit 20. The I/O processor 20-3 of the processing unit 20 divides the received command into individual commands and notifies the logical processing units of their respective commands. The edited commands are transmitted in the form of a message command block 50.

Where the connecting device 10 transmits the message command block 50 to the logical processing units 20-10 to 20-12, the block is made up of a header 50-1, a command code 50-2, and logical processing unit numbers 50-10 to 50-12 as well as pieces of command information 50-20 to 50-22 corresponding to the individual logical processing units 20-10 to 20-12.

It is the main processor 10-1 of the connecting device 10 that prepares the message command block 50 and sends it to the I/O processor 10-3 of the connecting device. In turn, the I/O processor 10-3 of the connecting device forwards the message command block 50 to the I/O processor 20-3 of the processing unit. Upon receipt of the message command block 50, the I/O processor 20-3 of the processing unit divides it into the header 50-1, command code 50-2 and command information 50-20 to 50-22 for each of the logical processing units 20-10 to 20-12, and notifies each logical processing unit of the command components applicable thereto. The order in which the logical processing units 20-10 to 20-12 are notified of their respective commands may be changed as needed.

In the manner described, the connecting device 10 edits three commands for the logical processing units 20-10 to 20-12 into a single command for transmission. The feature reduces the number of times commands are issued and lowers the occupancy level of the channel device.

Figure 5:
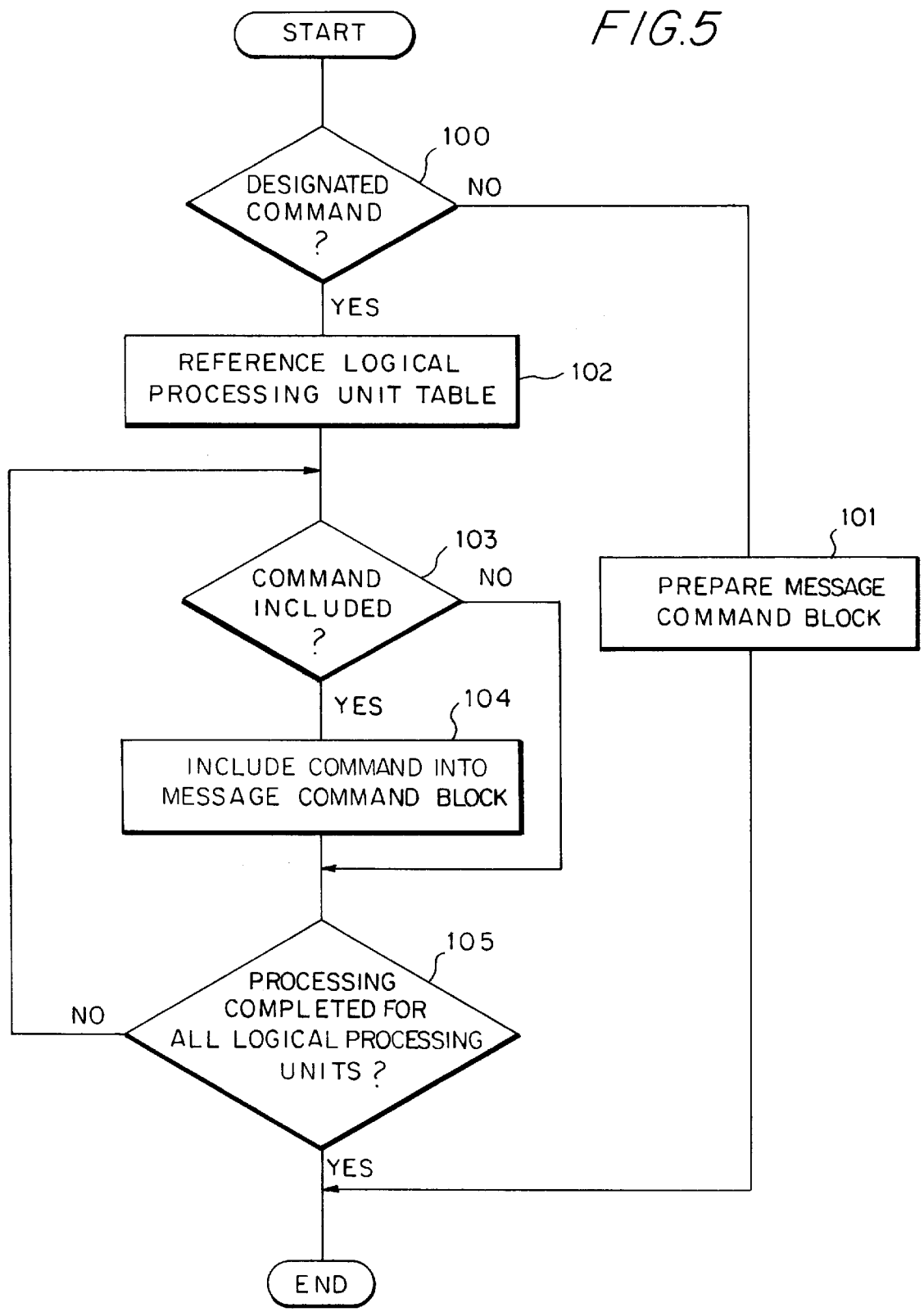
FIG. 5 is a flowchart of steps carried out by the connecting device issuing and editing commands.

Described below with reference to FIGS. 5 and 6 is how one embodiment of the present invention processes the issuance of commands by the connecting device. FIG. 5 is a flowchart of steps carried out by the connecting device 10 issuing and editing commands. FIG. 6 is a diagram of a logical processing unit table held in the connecting device 10.

The connecting device 10 first checks to see if the received command is any one of the designated commands, i.e., a command that may be transmitted as part of a command block (step 100). If the received command is not any one of the designated commands, that command alone is transferred. Illustratively, the header 50-1, command code 50-2 and command information 50-20 are placed into the command for transmission (step 101).

The designated commands to be edited in this example include the list notification command and the mutual invalidation command for notifying logical processing units of a state transition in the memory structures 30, 40. If the received command is any one of the designated commands, the connecting device references the logical processing unit table of FIG. 6 held in its memory (step 102). A check is then made to see if the command is to be transmitted to the logical processing units 20-10 to 20-12 (step 103). In the logical processing unit list, a circle (○) indicates that the mutual invalidation command or list notification command destined for the logical processing unit in question is to be included in a command block. In the example of FIG. 6, the commands for all logical processing units 20-10 to 20-12 are to be edited into a single command block.

The logical processing unit number 50-10 to 50-12 and command information 50-20 to 50-22 are placed into the command block for each logical processing unit each of 20-10 to 20-12. A check is made to see if all logical processing units 20-10 to 20-12 need mutual invalidation of their cache copies as well as list notification. Only those logical processing units that need such processing have their commands included into the message command block 50 (step 104).

A check is then made to see if the processing for all logical processing units 20-10 to 20-12 has been completed (step 105). If the processing is yet to be complete, steps 103 through 105 are repeated until the processing is finished. With the processing for all logical processing units brought to an end, the command editing process is terminated.

A second embodiment of the invention will now be described in connection with the case where the I/O processor 10-3 of the connecting device 10 transmits message command blocks 50 in the form of a single block. In this case, the main processor 10-1 of the connecting device 10 prepares a message command block 50 for each of the logical processing units 20-10 to 20-12, and the I/O processor 10-3 of the connecting device 10 edits the message command blocks 50 thus generated into a single block for transmission to the logical processing units 20-10 to 20-12.

Figure 7:
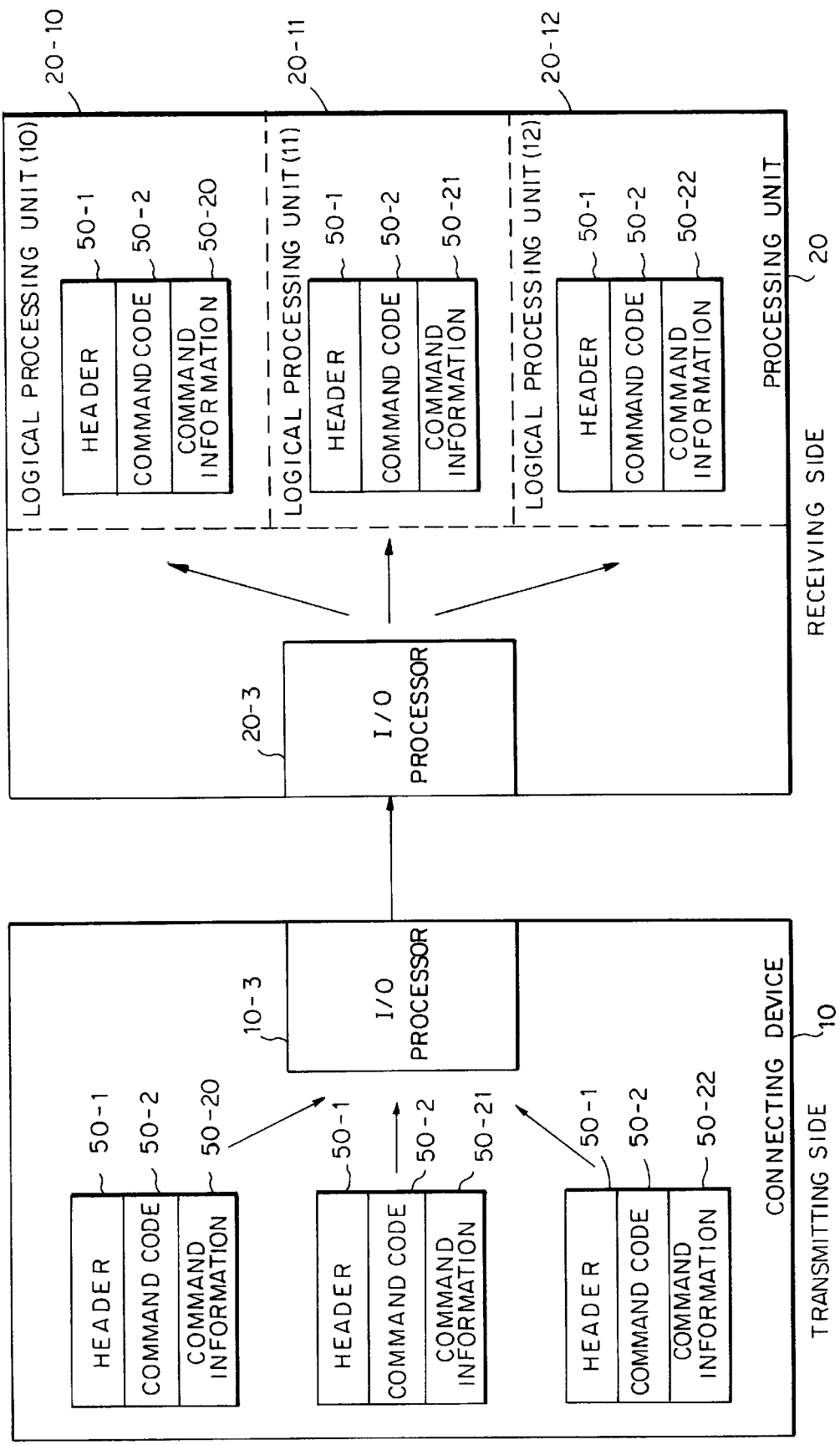
FIG. 7 is a schematic diagram illustrating how the connecting device issues commands in an alternative manner.

FIG. 7 is a schematic view illustrating how the connecting device issues commands alternatively. The main processor 10-1 of the connecting device 10 first prepares a message command block 50 for each of the logical processing units 20-10 to 20-12 and sends them to the I/O processor 10-3. The I/O processor 10-3 of the connecting device 10 edits the received three commands into a single command. Details of this process of editing commands are shown FIG. 8. The single command thus prepared is forwarded to the processing unit 20. Upon receipt of the command, the processing unit 20 divides it into the three commands destined for the three logical processing units 20-10 to 20-12 and notifies the units thereof.

Figure 8:
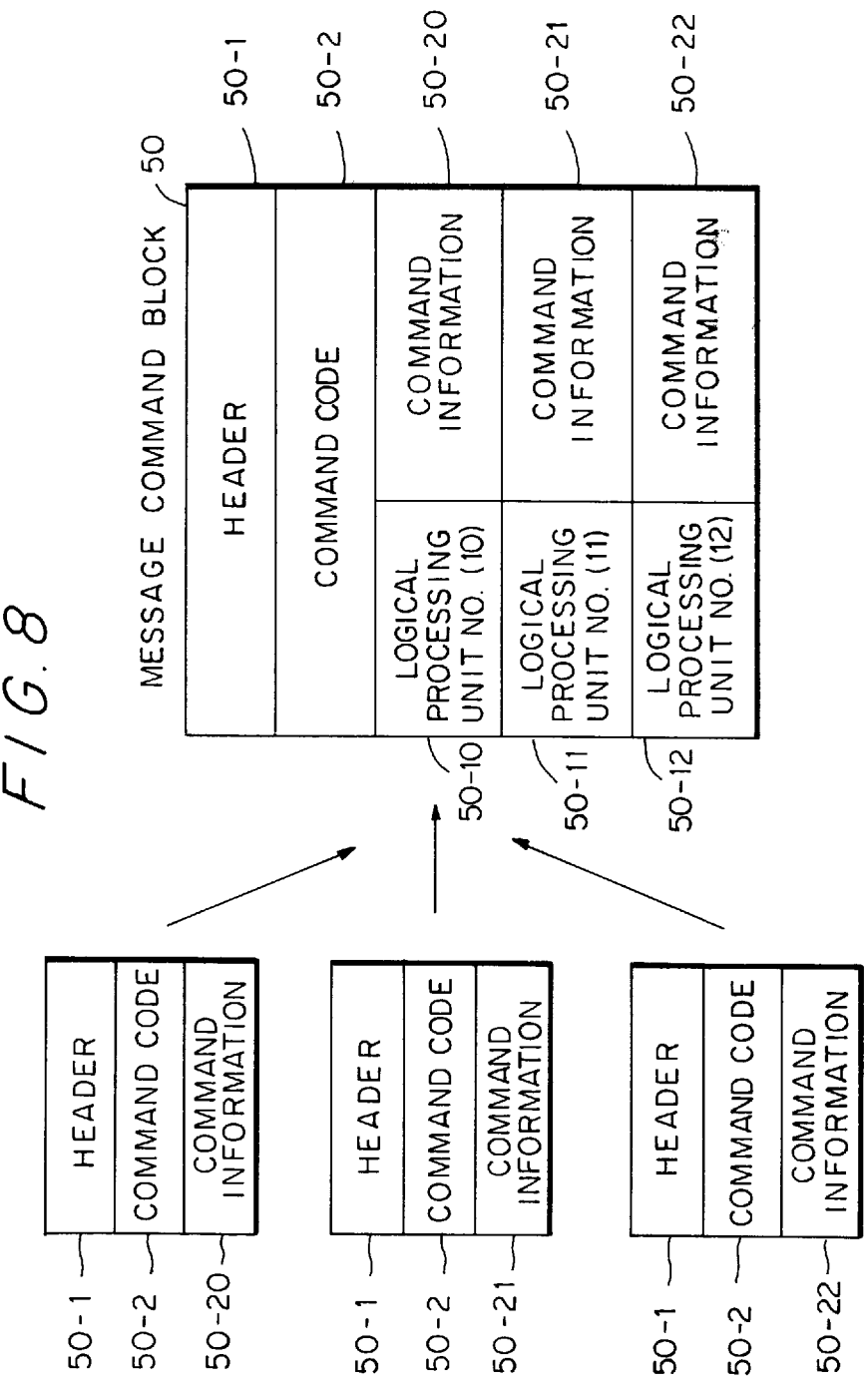
FIG. 8 is a schematic diagram illustrating how commands are processed by the I/O processor of the connecting device.

FIG. 8 is a schematic view illustrating in detail how a plurality of commands are edited into a single command by the I/O processor 10-3 of the connecting device 10. In this example, the connecting device 10 first generates three commands each comprising a header 50-1, a command code 50-2 and command information 50-20 to 50-22. The I/O processor of the connecting device 10-3 then edits the three commands into a single command. The single message command block 50 thus edited is made up of the header 50-1, command code 50-2, and pieces of command information 50-20 to 50-22 for each of the logical processing units 20-10 to 20-12.

Figure 9:
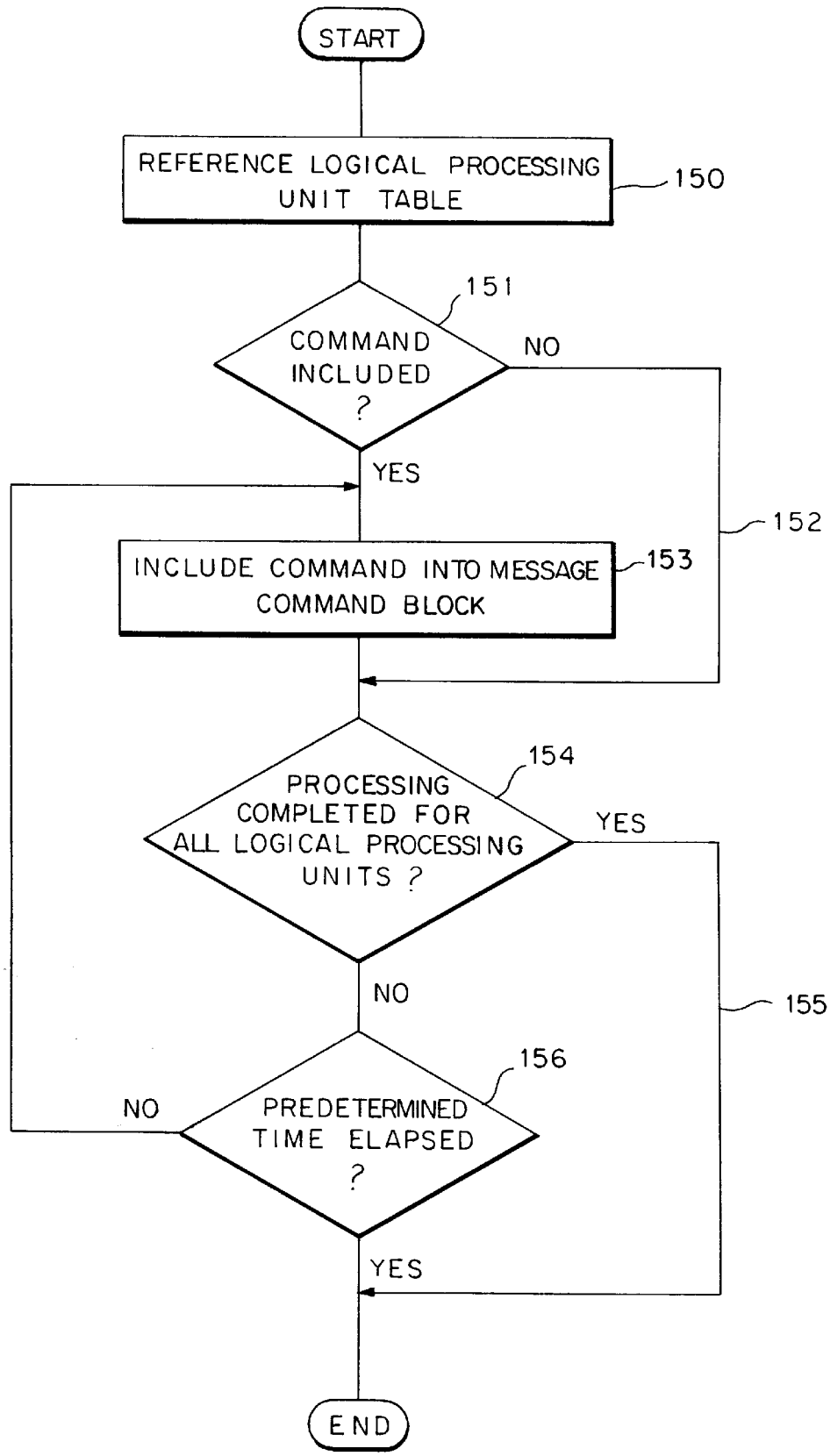
FIG. 9 is a flowchart of steps performed by the I/O processor of the connecting device when the latter issues commands.

FIG. 9 is a flowchart of steps performed by the I/O processor 10-3 of the connecting device when the latter issues commands. The I/O processor 10-3 first references the logical processing unit table of FIG. 6 (step 150). A check is made to see if the command in question is to be transmitted to one of the logical processing units 20-10 to 20-12 (step 151). Where the table FIG. 6 is in effect, mutual invalidation commands or list notification commands for all logical processing units 20-10 to 20-12 are edited into a single command.

A logical processing unit number and command information are stored for each of the logical processing units 20-10 to 20-12. A check is made to see if the mutual invalidation command or list notification command is needed for each of the logical processing units 20-10 to 20-12. The command is written to a message command block only if required by the logical processing unit in question (step 153). A check is then made to see if the processing of all logical processing units 20-10 to 20-12 has been finished (step 154). If the processing is found to be complete, the command editing process is terminated (step 155).

If the processing is yet to be complete, a check is made to see if a predetermined period of time has elapsed (step 156). If the predetermined time is found to have elapsed, the command editing process is canceled and terminated. If the predetermined period of time has yet to elapse, steps 153 and 154 are repeated.

A third embodiment of the present invention will now be described in connection with the case where the logical processing units 20-10 to 20-12 have received commands and return acknowledgements of these commands to the connecting device.

Figure 10:
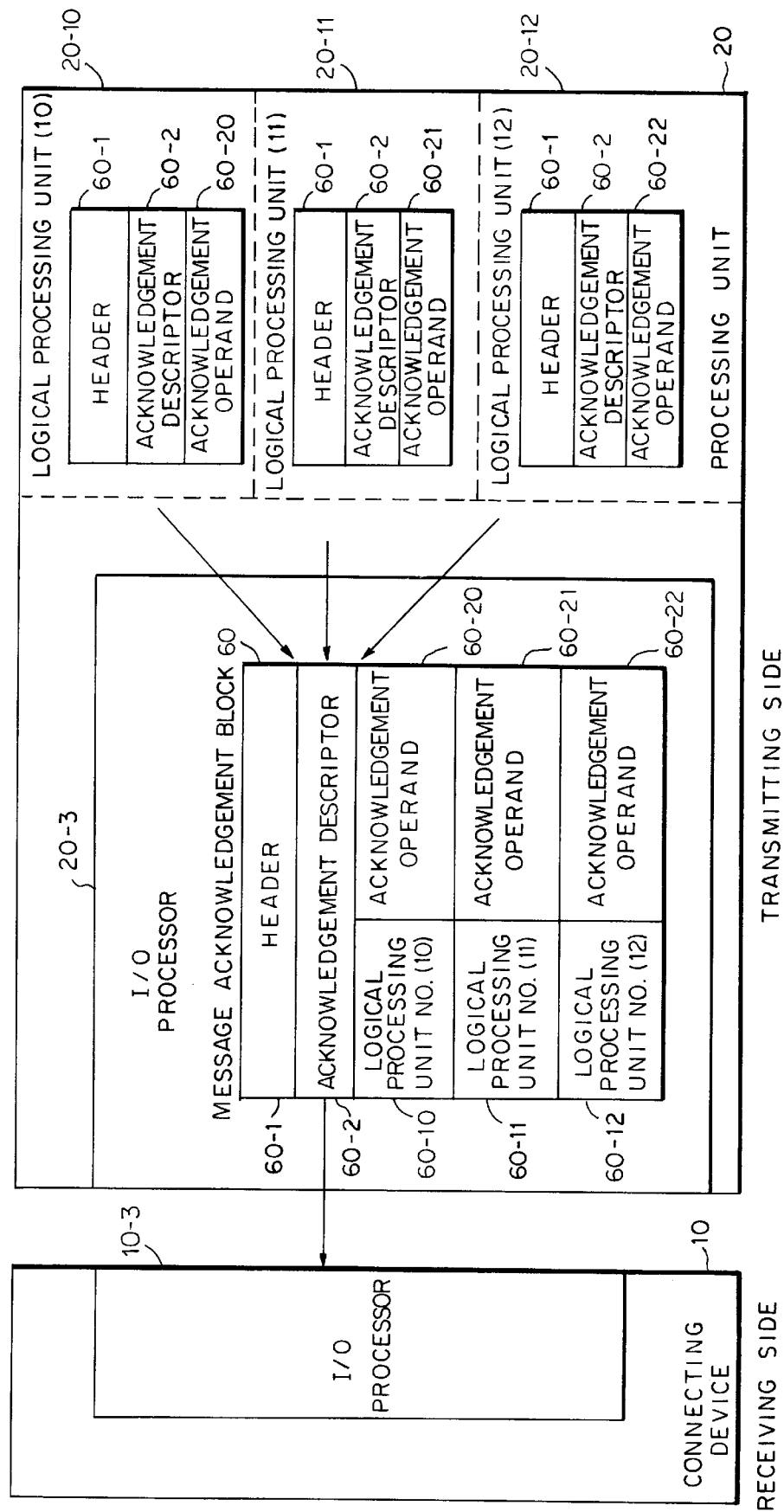
FIG. 10 is a schematic diagram illustrating how logical processing units return acknowledgements.

FIG. 10 is a schematic diagram illustrating how the logical processing units return acknowledgements. Each of the logical processing units 20-10 to 20-12 receives a command, executes the received command, and returns an acknowledgement of that command. In this case, the logical processing units 20-10 to 20-12 each prepare a message acknowledgement block 60 and send it to the I/O processor 20-3 of the processing unit. Upon receipt of the three message acknowledgement blocks, the I/O processor 20-3 of the processing unit edits them into a single message acknowledgement block 60. The message acknowledgement block 60 thus prepared is forwarded to the connecting device 10.

In the connecting device 10, the I/O processor 10-3 receives the message acknowledgement block and divides it into the message acknowledgement blocks destined for the individual logical processing units 20-10 to 20-12. The divided message acknowledgement blocks are subsequently processed in a suitable manner.

Figure 11:
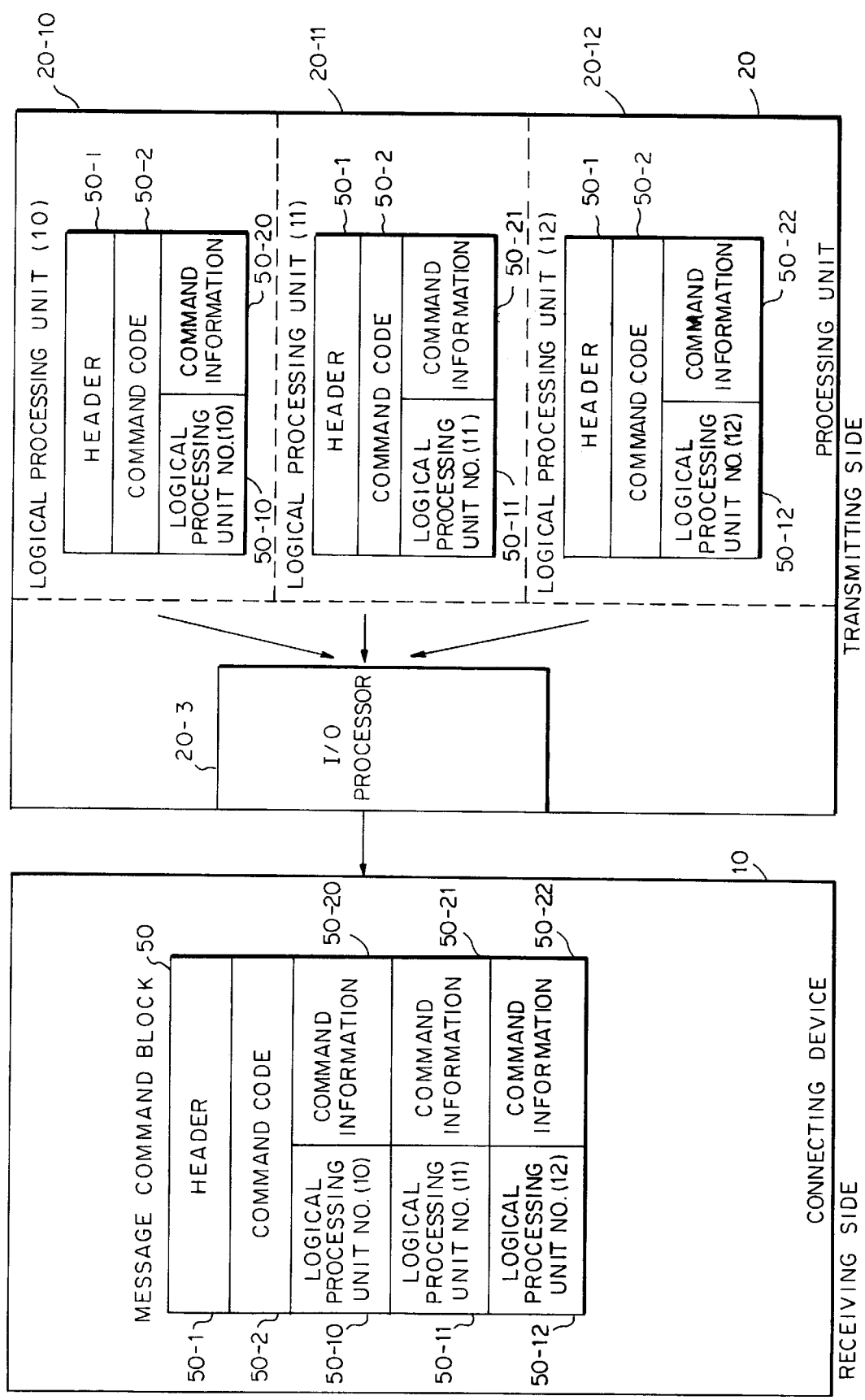
FIG. 11 is a schematic diagram illustrating how the commands sent from the logical processing units are processed.

A fourth embodiment of the present invention will now be described in connection with the case where the logical processing units 20-10 to 20-12 edit their commands into a single command for transmission to the connecting device. FIG. 11 is a schematic diagram illustrating how the I/O processor 20-3 of the processing unit deals with commands sent from the logical processing units 20-10 to 20-12. What specifically takes place is as follows:

Each of the logical processing units 20-10 to 20-12 prepares a message command block 50. The message command blocks 50 thus generated are transmitted to the I/O processor 20-3 of the processing unit. On receiving the three message command blocks, the I/O processor 20-3 of the processing unit edits them into a single message command block 50 to be transmitted to the connecting device 10. The main processor of the processing unit may alternatively edit a plurality of commands into a single command or a plurality of acknowledgements into a single acknowledgement.

In the connecting device 10, the I/O processor 10-3 divides the received message command block into the individual message command blocks destined for the logical processing units 20-10 to 20-12. The divided message command blocks are then suitably processed.

Figure 12:
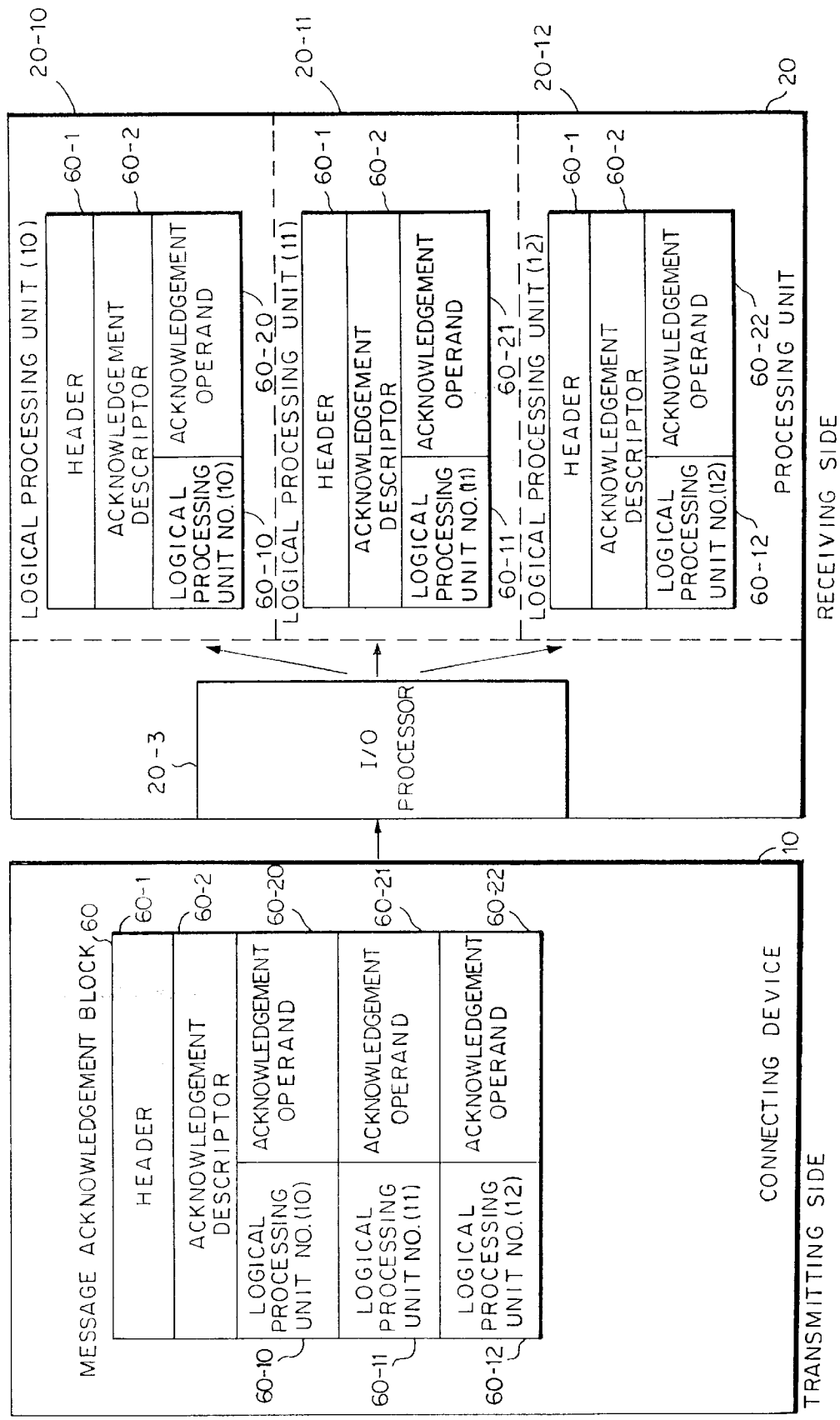
FIG. 12 is a schematic diagram illustrating how the commands issued by the processing unit are processed.

FIG. 12 is a schematic diagram illustrating how the connecting device responds to commands issued by the processing unit. The connecting device 10 prepares message acknowledgement blocks 60 destined for the logical processing units and sends the blocks to its I/O processor 10-3. Upon receipt of the three message acknowledgement blocks, the I/O processor 10-3 of the connecting device 10 edits them into a single message acknowledgement block 60. The message acknowledgement block 60 thus prepared is transmitted to the processing unit 20.

In the processing unit 20, the I/O processor 20-3 divides the received message acknowledgement block 60 into the individual message acknowledgement blocks destined for the logical processing units 20-10 to 20-12. The divided message acknowledgement blocks are then suitably processed.

As described and according to the present invention, the system with its one processing unit 20 divided into a plurality of logical processing units 20-10 to 20-12 allows the connecting device 10 to issue individual commands or acknowledgements to these units in the form of a single command or acknowledgement. Likewise, the system according to the present invention allows the logical processing units to send their commands or acknowledgements to the connecting device 10 in the form of a single command or acknowledgement. The reduced number of commands or acknowledgements transferred makes it possible to lower the occupancy level of the channel device.

Although the embodiments have been described in conjunction with a single processing unit, this is not limitative of the present invention. The present invention is also applied obviously to cases where a plurality of processing units are divided into a plurality of logical processing units.

The present invention as embodied above reduces the number of commands exchanged between the processing unit and the connecting device inside a parallel computer system. This contributes to minimizing those delays in command execution which are attributable to the increase in command traffic.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A block transfer method for use with a parallel computer system including at least one processing unit divisible into a plurality of logical processing units, and a connecting device shared by and connected to said logical processing units, said logical processing units and said connecting device exchanging therebetween commands representing processing requests, said block transfer method comprising the steps of:

causing said connecting device to edit a plurality of nieces of command information to be sent from said connecting device to said logical processing units into a single command; and transmitting said single command to said processing unit, wherein said connecting device comprises:

a main processor for processing commands from said logical processing units and generating commands to be sent to said logical processing units and an input/output processor for receiving commands from said processing unit and transmitting commands to said processing unit, and wherein said causing step comprises the steps of:

causing said input/output processor of said connecting device to edit into a single command said pieces of command information generated by said main processor of said connecting device regarding each of said logical processing units and transmitting said single command to said processing unit.

2. A block transfer method according to claim 1, wherein said processing unit comprises:

a main processor for processing commands from said connecting device and generating commands to be sent to said connecting device; and an input/output processor for receiving commands from said connecting device and transmitting commands to said connecting device, wherein said block transfer method further comprises the steps of:

causing said input/output processor of said processing unit to receive said single command from said connecting device and divide said single command into said pieces of command information, and supplying said pieces of command information to said logical processing units.

3. A block transfer method for use with a parallel computer system including at least one processing unit divisible into a plurality of logical processing units, and a connecting device shared by and connected to said logical processing units, said logical processing units and said connecting device exchanging therebetween commands representing processing requests, said block transfer method comprising the steps of:

causing said connecting device to edit a plurality of pieces of command information to be sent from said connecting device to said logical processing units into a single command;

transmitting said single command to said processing unit, wherein said processing unit comprises:

a main processor for processing commands from said connecting device and generating commands to be sent to said connecting device, and an input/output processor for receiving commands from said connecting device and transmitting commands to said connecting device;

causing said input/output processor of said processing unit to receive said single command from said connecting device and divide said single command into said pieces of command information; and supplying said pieces of command information to said logical processing units.

4. A block transfer method for use with a parallel computer system including at least one processing unit divisible into a plurality of logical processing units, and a connecting device shared by and connected to said logical processing units, said logical processing units and said connecting device exchanging therebetween commands representing processing requests, said block transfer method comprising the steps of:

causing said processing unit to edit a plurality of pieces of command information to be sent from said logical processing units to said connecting device into a single command; and transmitting said single command to said connecting device, wherein said processing unit comprises:

a main processor for processing commands from said connecting device and generating commands to be sent to said connecting device, and an input/output processor for receiving commands from said connecting device and transmitting commands to said connecting device, and wherein said causing step comprises the steps of:

causing said input/output processor of said processing unit to edit into a single command said pieces of command information to be sent to said connecting device, and transmitting said single command to said connecting device.

5. A block transfer method according to claim 4, wherein said connecting device comprises:

a main processor for processing commands from said logical processing units and generating commands to be sent to said logical processing units; and an input/output processor for receiving commands from said processing unit and transmitting commands to said processing unit, wherein said block transfer method further comprises the steps of:

causing said input/output processor of said connecting unit to receive said single command from said processing unit and divide said single command into said pieces of command information; and transmitting said single command to other processing units.

6. A block transfer method for use with a parallel computer system including at least one processing unit divisible into a plurality of logical processing units, and a connecting device shared by and connected to said logical processing units, said logical processing units and said connecting device exchanging therebetween commands representing processing requests, said block transfer method comprising the steps of:

causing said processing unit to edit a plurality of pieces of command information to be sent from said logical processing units to said connecting device into a single command;

transmitting said single command to said connecting device, wherein said connecting device comprises:

a main processor for processing commands from said logical processing units and generating commands to be sent to said logical processing units, and an input/output processor for receiving commands from said processing unit and transmitting commands to said processing unit;

causing said input/output processor of said connecting unit to receive said single command from said processing unit and divide said single command into said pieces of command information; and transmitting said single command to other processing units.

7. A block transfer method for use with a parallel computer system including at least one processing unit divisible into a plurality of logical processing units, and a connecting device shared by and connected to said logical processing units, said logical processing units and said connecting device exchanging therebetween acknowledgements representing results of command processing, said block transfer method comprising the steps of:

causing said connecting device to edit a plurality of acknowledgements to be sent from said connecting device to said logical processing units into a single acknowledgement; and transmitting said single acknowledgement to said processing unit, wherein said connecting device comprises:

an input/output processor for receiving acknowledgements from said processing unit and transmitting acknowledgements to said processing unit, and wherein said causing step comprises the steps of:

causing said input/output processor of said connecting device to edit into said single acknowledgement said acknowledgements to be sent to said processing units, and transmitting said single acknowledgement to said processing unit.

8. A block transfer method according to claim 7, wherein said processing unit comprises:

an input/output processor for receiving acknowledgements from said connecting device and transmitting acknowledgements to said connecting device, wherein said block transfer method further comprises the steps of:

causing said input/output processor of said processing unit to receive said single acknowledgement from said connecting device and divide said single acknowledge into said acknowledgements; and supplying said acknowledgement to said logical processing units.

9. A block transfer method for use with a parallel computer system including at least one processing unit divisible into a plurality of logical processing units, and a connecting device shared by and connected to said logical processing units, said logical processing units and said connecting device exchanging therebetween acknowledgements representing results of command processing, said block transfer method comprising the steps of:

causing said connecting device to edit a plurality of acknowledgements to be sent from said connecting device to said logical processing units into a single acknowledgement;

transmitting said single acknowledgement to said processing unit, wherein said processing unit comprises:

an input/output processor for receiving acknowledgements from said connecting device and transmitting acknowledgements to said connecting device;

causing said input/output processor of said processing unit to receive said single acknowledgement from said connecting device and divide said single acknowledge into said acknowledgements; and supplying said acknowledgements to said logical processing units.

10. A block transfer method for use with a parallel computer system including at least one processing unit divisible into a plurality of logical processing units, and a connecting device shared by and connected to said logical processing units, said logical processing units and said connecting device exchanging therebetween acknowledgements representing results of command processing, said block transfer method comprising the steps of:

causing said processing unit to edit a plurality of acknowledgements to be sent from said logical processing units to said connecting device into a single acknowledgement; and transmitting said single acknowledge to said connecting device, wherein said processing unit comprises:

an input/output processor for receiving acknowledgements from said connecting device and transmitting acknowledgements to said connecting device, and wherein said causing step comprises the steps of:

causing said input/output processor of said processing unit to edit into said single acknowledgment said acknowledgements to be sent to said connecting device, and transmitting said single acknowledgement to said connecting device.

11. A block transfer method according to claim 10, wherein said connecting device comprises:

an input/output processor for receiving acknowledgements from said processing unit and transmitting acknowledgements to said processing unit, wherein said block transfer method comprises the steps of:

causing said input/output processor of said connecting unit to receive said single acknowledgement from said processing unit and divide said single acknowledge into said acknowledgements; and supplying said acknowledgements to other processing units.

12. A block transfer method for use with a parallel computer system including at least one processing unit divisible into a plurality of logical processing units, and a connecting device shared by and connected to said logical processing units, said logical processing units and said connecting device exchanging therebetween acknowledgements representing results of command processing, said block transfer method comprising the steps of:

causing said processing unit to edit a plurality of acknowledgements to be sent from said logical processing units to said connecting device into a single acknowledgement;

transmitting said single acknowledge to said connecting device, wherein said connecting device comprises:

an input/output processor for receiving acknowledgements from said processing unit and transmitting acknowledgements to said processing unit;

causing said input/output processor of said connecting unit to receive said single acknowledgement from said processing unit and divide said single acknowledge into said acknowledgements; and supplying said acknowledgements to other processing units.

13. A computer program stored in a storage medium for execution by a parallel computer system including at least one processing unit divisible into a plurality of logical processing units, and a connecting device shared by and connected to said logical processing units, said logical processing units and said connecting device exchanging therebetween commands representing processing requests, said computer program comprising the steps of:

causing said connecting device to edit a plurality of pieces of command information to be sent from said connecting device to said logical processing units into a single command; and transmitting said single command to said processing unit, wherein said connecting device comprises:

a main processor for processing commands from said logical processing units and generating commands to be sent to said logical processing units, and an input/output processor for receiving commands from said processing unit and transmitting commands to said processing unit, and wherein said causing step comprises the steps of:

causing said input/output processor of said connecting device to edit into a single command said pieces of command information generated by said main processor of said connecting device regarding each of said logical processing units, and transmitting said single command to said processing unit.

14. A computer program according to claim 13, wherein said processing unit comprises:

a main processor for processing commands from said connecting device and generating commands to be sent to said connecting device; and an input/output processor for receiving commands from said connecting device and transmitting commands to said connecting device, wherein said computer program further comprises the steps of:

causing said input/output processor of said processing unit to receive said single command from said connecting device and divide said single command into said pieces of command information; and supplying said pieces of command information to said logical processing units.

15. A computer program stored in a storage medium for execution by a parallel computer system including at least one processing unit divisible into a plurality of logical processing units, and a connecting device shared by and connected to said logical processing units, said logical processing units and said connecting device exchanging therebetween commands representing processing requests, said computer program comprising the steps of:

causing said connecting device to edit a plurality of pieces of command information to be sent from said connecting device to said logical processing units into a single command;

transmitting said single command to said processing unit,
wherein said processing unit comprises:
  a main processor for processing commands from said connecting device and generating commands to be sent to said connecting device, and
  an input/output processor for receiving commands from said connecting device and transmitting commands to said connecting device,
  causing said input/output processor of said processing unit to receive said single command from said connecting device and divide said single command into said pieces of command information; and
  supplying said pieces of command information to said logical processing units.

16. A computer program stored in a storage medium for execution by a parallel computer system including at least one processing unit divisible into a plurality of logical processing units, and a connecting device shared by and connected to said logical processing units, said logical processing units and said connecting device exchanging therebetween commands representing processing requests, said computer program comprising the steps of:
  causing said processing unit to edit a plurality of pieces of command information to be sent from said logical processing units to said connecting device into a single command; and
  transmitting said single command to said connecting device,
  wherein said processing unit comprises:
    a main processor for processing commands from said connecting device and generating commands to be sent to said connecting device, and
    an input/output processor for receiving commands from said connecting device and transmitting commands to said connecting device, and
    wherein said causing step comprises the steps of:
      causing said input/output processor of said processing unit to edit into a single command said pieces of command information to be sent to said connecting device, and
  transmitting said single command to said connecting device.

17. A computer program according to claim 16, wherein said connecting device comprises:
  a main processor for processing commands from said logical processing units and generating commands to be sent to said logical processing units; and
  an input/output processor for receiving commands from said processing unit and transmitting commands to said processing unit,
  wherein said computer program further comprises the steps of:
    causing said input/output processor of said connecting unit to receive said single command from said processing unit and divide said single command into said pieces of command information; and
    transmitting said single command to other processing units.

18. A computer program stored in a storage medium for execution by a parallel computer system including at least one processing unit divisible into a plurality of logical processing units, and a connecting device shared by and connected to said logical processing units, said logical processing units and said connecting device exchanging therebetween commands representing processing requests, said computer program comprising the steps of:
  causing said processing unit to edit a plurality of pieces of command information to be sent from said logical processing units to said connecting device into a single command;
  transmitting said single command to said connecting device,
  wherein said connecting device comprises:
    a main processor for processing commands from said logical processing units and generating commands to be sent to said logical processing units, and
    an input/output processor for receiving commands from said processing unit and transmitting commands to said processing unit;
  causing said input/output processor of said connecting unit to receive said single command from said processing unit and divide said single command into said pieces of command information; and
  transmitting said single command to other processing units.

19. A computer program stored in a storage medium for execution by a parallel computer system including at least one processing unit divisible into a plurality of logical processing units, and a connecting device shared by and connected to said logical processing units, said logical processing units and said connecting device exchanging therebetween acknowledgements representing results of command processing, said computer program comprising the steps of:
  causing said connecting device to edit a plurality of acknowledgements to be sent from said connecting device to said logical processing units into a single acknowledgement; and
  transmitting said single acknowledgement to said processing unit,
  wherein said connecting device comprises:
    an input/output processor for receiving acknowledgements from said processing unit and transmitting acknowledgements to said processing unit, and
    wherein said causing step comprises the steps of:
      causing said input/output processor of said connecting device to edit into said single acknowledgement said acknowledgements to be sent to said processing units, and
      transmitting said single acknowledgement to said processing unit.

20. A computer program stored in a storage medium for execution by a parallel computer system including at least one processing unit divisible into a plurality of logical processing units, and a connecting device shared by and connected to said logical processing units, said logical processing units and said connecting device exchanging therebetween acknowledgements representing results of command processing, said computer program comprising the steps of:
  causing said connecting device to edit a plurality of acknowledgements to be sent from said connecting device to said logical processing units into a single acknowledgement;
  transmitting said single acknowledgement to said processing unit,
  wherein said processing unit comprises:
    an input/output processor for receiving acknowledgements from said connecting device and transmitting acknowledgements to said connecting device;
    causing said input/output processor of said processing unit to receive said single acknowledgement from said connecting device and divide said single acknowledge into said acknowledgements; and supplying said acknowledgements to said logical processing units.

21. A computer program stored in a storage medium for execution by a parallel computer system including at least one processing unit divisible into a plurality of logical processing units, and a connecting device shared by and connected to said logical processing units, said logical processing units and said connecting device exchanging therebetween acknowledgements representing results of command processing, said computer program comprising the steps of:

causing said connecting device to edit a plurality of acknowledgements to be sent from said connecting device to said logical processing units into a single acknowledgement;

transmitting said single acknowledgement to said processing unit, wherein said processing unit comprises:
an input/output processor for receiving acknowledgements from said connecting device and transmitting acknowledgements to said connecting device;

causing said input/output processor of said processing unit to receive said single acknowledgement from said connecting device and divide said single acknowledge into said acknowledgements; and supplying said acknowledgement to said logical processing units.

22. A computer program stored in a storage medium for execution by a parallel computer system including at least one processing unit divisible into a plurality of logical processing units, and a connecting device shared by and connected to said logical processing units, said logical processing units and said connecting device exchanging therebetween acknowledgements representing results of command processing, said computer program comprising the steps of:

causing said processing unit to edit a plurality of acknowledgements to be sent from said logical processing units to said connecting device into a single acknowledgement; and transmitting said single acknowledge to said connecting device, wherein said processing unit comprises:
an input/output processor for receiving acknowledgements from said connecting device and transmitting acknowledgements to said connecting device, and
wherein said causing step comprises the steps of:
causing said input/output processor of said processing unit to edit into said single acknowledgment said acknowledgements to be sent to said connecting device, and
transmitting said single acknowledgement to said connecting device.

23. A computer program according to claim 22, wherein said connecting device comprises:

an input/output processor for receiving acknowledgements from said processing unit and transmitting acknowledgements to said processing unit, wherein said computer program comprises the steps of:
causing said input/output processor of said connecting unit to receive said single acknowledgement from said processing unit and divide said single acknowledge into said acknowledgements; and supplying said acknowledgements to other processing units.

24. A computer program stored in a storage medium for execution by a parallel computer system including at least one processing unit divisible into a plurality of logical processing units, and a connecting device shared by and connected to said logical processing units, said logical processing units and said connecting device exchanging therebetween acknowledgements representing results of command processing, said computer program comprising the steps of:

causing said processing unit to edit a plurality of acknowledgements to be sent from said logical processing units to said connecting device into a single acknowledgement;

transmitting said single acknowledge to said connecting device, wherein said connecting device comprises:
an input/output processor for receiving acknowledgements from said processing unit and transmitting acknowledgements to said processing unit;

causing said input/output processor of said connecting unit to receive said single acknowledgement from said processing unit and divide said single acknowledge into said acknowledgements; and supplying said acknowledgements to other processing units.

25. A parallel computer system comprising:

at least one processing unit divisible into a plurality of logical processing units; and a connecting device shared by and connected to said logical processing units, wherein said logical processing units and said connecting device exchange therebetween commands representing processing requests, wherein said connecting device edits a plurality of pieces of command information to be sent from said connecting device to said logical processing units into a single command, and transmits said single command to said processing unit, wherein said connecting device comprises:
a main processor for processing commands from said logical processing units and generating commands to be sent to said logical processing units, and
an input/output processor for receiving commands from said processing unit and transmitting commands to said processing unit, and
wherein said input/output processor of said connecting device edits into a single command said pieces of command information generated by said main processor of said connecting device regarding each of said logical processing units, and transmits said single command to said processing unit.

26. A parallel computer system according to claim 25, wherein said processing unit comprises:

a main processor for processing commands from said connecting device and generating commands to be sent to said connecting device; and an input/output processor for receiving commands from said connecting device and transmitting commands to said connecting device, wherein said input/output processor of said processing unit receives said single command from said connecting device, divides said single command into said pieces of command information, and supplies said pieces of command information to said logical processing units.

27. A parallel computer system comprising:

at least one processing unit divisible into a plurality of logical processing units; and a connecting device shared by and connected to said logical processing units, wherein said logical processing units and said connecting device exchange therebetween commands representing processing requests, wherein said connecting device edits a plurality of pieces of command information to be sent from said connecting device to said logical processing units into a single command, and transmits said single command to said processing unit, wherein said processing unit comprises:
  a main processor for processing commands from said connecting device and generating commands to be sent to said connecting device, and
  an input/output processor for receiving commands from said connecting device and transmitting commands to said connecting device, and
  wherein said input/output processor of said processing unit receives said single command from said connecting device, divides said single command into said pieces of command information, and supplies said pieces of command information to said logical processing units.

28. A parallel computer system comprising:

at least one processing unit divisible into a plurality of logical processing units; and a connecting device shared by and connected to said logical processing units, wherein said logical processing units and said connecting device exchange therebetween commands representing processing requests.

wherein said processing unit edits a plurality of pieces of command information to be sent from said logical processing units to said connecting device into a single command, and transmits said single command to said connecting device, wherein said processing unit comprises:
  a main processor for processing commands from said connecting device and generating commands to be sent to said connecting device, and
  an input/output processor for receiving commands from said connecting device and transmitting commands to said connecting device, and
  wherein said input/output processor of said processing unit edits into a single command said pieces of command information to be sent to said connecting device, and transmits said single command to said connecting device.

29. A parallel computer system according to claim 28, wherein said connecting device comprises:

a main processor for processing commands from said logical processing units and generating commands to be sent to said logical processing units; and
  an input/output processor for receiving commands from said processing unit and transmitting commands to said processing unit,
  wherein said input/output processor of said connecting unit receives said single command from said processing unit, divides said single command into said pieces of command information, and transmits said single command to other processing units.

30. A parallel computer system comprising:

at least one processing unit divisible into a plurality of logical processing units; and a connecting device shared by and connected to said logical processing units, wherein said logical processing units and said connecting device exchange therebetween commands representing processing requests, wherein said processing unit edits a plurality of pieces of command information to be sent from said logical processing units to said connecting device into a single command, and transmits said single command to said connecting device, wherein said connecting device comprises:
  a main processor for processing commands from said logical processing units and generating commands to be sent to said logical processing units, and
  an input/output processor for receiving commands from said processing unit and transmitting commands to said processing unit, and
  wherein said input/output processor of said connecting unit receives said single command from said processing unit, divides said single command into said pieces of command information, and transmits said single command to other processing units.

31. A parallel computer system comprising:

at least one processing unit divisible into a plurality of logical processing units; and a connecting device shared by and connected to said logical processing units, wherein said logical processing units and said connecting device exchanging therebetween acknowledgements representing results of command processing, wherein said connecting device edits a plurality of acknowledgements to be sent from said connecting device to said logical processing units into a single acknowledgement, and transmits said single acknowledgement to said processing unit, wherein said connecting device comprises:
  an input/output processor for receiving acknowledgements from said processing unit and transmitting acknowledgements to said processing unit, and
  wherein said input/output processor of said connecting device edits into said single acknowledgement said acknowledgements to be sent to said processing units, and transmits said single acknowledgement to said processing unit.

32. A parallel computer system comprising:

at least one processing unit divisible into a plurality of logical processing units; and a connecting device shared by and connected to said logical processing units, wherein said logical processing units and said connecting device exchanging therebetween acknowledgements representing results of command processing, wherein said connecting device edits a plurality of acknowledgements to be sent from said connecting device to said logical processing units into a single acknowledgement, and transmits said single acknowledgement to said processing unit, wherein said processing unit comprises:
  an input/output processor for receiving acknowledgements from said connecting device and transmitting acknowledgements to said connecting device, and wherein said input/output processor of said processing unit receives said single acknowledgement from said connecting device, divides said single acknowledge into said acknowledgements, and supplies said acknowledgements to said logical processing units.

33. A parallel computer system comprising:

at least one processing unit divisible into a plurality of logical processing units; and a connecting device shared by and connected to said logical processing units, wherein said logical processing units and said connecting device exchanging therebetween acknowledgements representing results of command processing, wherein said connecting device edits a plurality of acknowledgements to be sent from said connecting device to said logical processing units into a single acknowledgement, and transmits said single acknowledgement to said processing unit, wherein said processing unit comprises:
  an input/output processor for receiving acknowledgements from said connecting device and transmitting acknowledgements to said connecting device, and
  wherein said input/output processor of said processing unit receives said single acknowledgement from said connecting device, divides said single acknowledge into said acknowledgements, and supplies said acknowledgement to said logical processing units.

34. A parallel computer system comprising:

at least one processing unit divisible into a plurality of logical processing units; and a connecting device shared by and connected to said logical processing units, wherein said logical processing units and said connecting device exchanges therebetween acknowledgements representing results of command processing, wherein said processing unit edits a plurality of acknowledgements to be sent from said logical processing units to said connecting device into a single acknowledgement, and transmits said single acknowledge to said connecting device, wherein said processing unit comprises:
  an input/output processor for receiving acknowledgements from said connecting device and transmitting acknowledgements to said connecting device, and
  wherein said input/output processor of said processing unit edits into said single acknowledgment said acknowledgements to be sent to said connecting device, and transmits said single acknowledgement to said connecting device.

35. A parallel computer system according to claim 34, wherein said connecting device comprises:
  an input/output processor for receiving acknowledgements from said processing unit and transmitting acknowledgements to said processing unit,
  wherein said input/output processor of said connecting unit receives said single acknowledgement from said processing unit, divides said single acknowledge into said acknowledgements, and supplies said acknowledgements to other processing units.

36. A parallel computer system comprising:

at least one processing unit divisible into a plurality of logical processing units; and a connecting device shared by and connected to said logical processing units, wherein said logical processing units and said connecting device exchanges therebetween acknowledgements representing results of command processing, wherein said processing unit edits a plurality of acknowledgements to be sent from said logical processing units to said connecting device into a single acknowledgement, and transmits said single acknowledge to said connecting device, wherein said connecting device comprises:
  an input/output processor for receiving acknowledgements from said processing unit and transmitting acknowledgements to said processing unit, and
  wherein said input/output processor of said connecting unit receives said single acknowledgement from said processing unit, divides said single acknowledge into said acknowledgements, and supplies said acknowledgements to other processing units.

* * * * *